Patented June 28, 1932

1,864,590

UNITED STATES PATENT OFFICE

ALBERT F. FIFIELD, OF ST. CATHARINES, ONTARIO, CANADA, ASSIGNOR TO THE AMERICAN FORK & HOE COMPANY, OF CLEVELAND, OHIO, A CORPORATION OF OHIO

PROCESS OF PREPARING WEARING SURFACES FOR TOOLS, DIES, AND THE LIKE, AND RESULTANT PRODUCT

No Drawing. Application filed May 11, 1925. Serial No. 29,571.

This invention relates to a process of preparing wearing surfaces for tools, dies and and the like and resultant product.

More particularly this invention relates to a process or method of preparing wearing surfaces or wearing parts of tools, dies and like articles and the principal object of the invention is to provide a very simple and economical method of preparing a hard wearing surface of tool steel and the like for various kinds of tools and dies, and further to provide a method of renewing the wearing surfaces at a very small cost whenever required.

In the manufacture of tools, dies and the like, it is necessary to provide a surface of exceedingly hard material to withstand present operating conditions. Various kinds of metallic alloys have been produced which, to a large extent, meet the working requirements, but such materials are expensive and subject to breakage when, for instance a whole tool or die is made of such integral material in order to procure a working surface of proper hardness. In the case of tools such as dipper teeth, cutting surfaces or the like, it has been necessary to cast or otherwise form the whole tool of "stellite", or other hard metallic alloys, in order to acquire the benefits of a hard working surface for the instrument. As these alloys are, comparatively, expensive, the cost of the tools and of renewals due to subsequent breakage has been correspondingly high. In many cases, it has been attempted to form the base or the shank of the tool or other instrument of a baser metal and to weld, rivet, bolt or otherwise secure a body of hard material comprising the working surface thereof, to the body of the tool or implement. In the case of dies, this method has not proved satisfactory and in the case of other tools, the percentage of breakage is high and the cost of renewal is very considerable, although not as high as where the use of such hard metallic alloys is not had. My invention is designed to provide tools, dies and working parts with surfaces, points or cutting edges of a high grade very hard metallic alloy at a very small cost, and further to provide a method of renewing the working surfaces and parts at any time at a minimum expense.

According to my invention, I employ a method of "flowing" a comparatively thin film or layer of a hard alloy, such as stellite, over the surface, working face or point of a die, tool or other implement, which is made of less expensive metal, and of simultaneously heating such surface or point of such tool to a melting temperature in order to weld the film or layer of the hard alloy material to the base metal. For instance, in the case of a die, I form the body of the die of a suitable inexpensive metal cast or formed to shape from a suitable pattern, and preferably formed to be of less than the required ultimate dimensions in the portions where the hard working surface is required. Over such portions I then flow a comparatively thin film or layer of stellite or equivalent material which is a well known metallic alloy of exceptional hardness, melting the stellite by means of an oxy-acetylene flame, electric arc or other means, and at the same time melting the face of such portions of the die, so that an intimate junction is had between the fluid stellite and the molten metal underlying the working surface or edge of the die. It is important to keep both the stellite and the material of the die at the proper temperatures to cause them to flow together at joining portions and this is accomplished by virtue of the larger mass of the die material rapidly conveying heat from the molten portion to which the stellite is to be welded, to keep the molten die material at a lower temperature than that of the stellite being added to it. The stellite is added in strips or pieces of relatively small mass which becomes heated, prior to welding with the die material, to a temperature higher than that of such material, and is chilled down to the same temperature only after it reaches the fluid state and intimately engages the cooler melted die material which abstracts such of its heat, such abstraction of heat from the molten stellite starts the congealing of the same, while the congealing of the die material follows later at a lower temperature. The die with congealed stellite at its working face or edge is an integral structure comprising a base of baser material such as iron faced at a working surface by stellite, bonded or welded to the base metal of the die. The working surface of the die is then ground to shape ready for use.

In preparing a die for application of a cutting edge portion of such alloy material as "stellite" and for instance where the die is one where the edge is formed by the meeting of two surfaces joining at right angles, I may preferably grind or otherwise machine such edge portion away to a depth such as one-sixteenth or one-eighth inch so that the edge will be flattened off, and then the stellite material is flowed onto the resulting ground surface until built up to an amount just greater than the amount of removed die edge portion. Subsequently by grinding, the right-angled character of the edge is restored and the edge sharpened and the die is ready for use. When adding the stellite or like alloy to the ground or other surface, it is supplied in pieces of small mass, and a heating flame such as an oxy-acetylene flame or the flame of an electric arc applied to it and to the base portion, only, to be surfaced, although the melting temperature of the stellite or like alloy may be greatly in excess of that of the base material it may be heated to such higher temperature while by the same flame the base portion is heated to a lower melting temperature due to the fact that other adjacent base portions abstract heat by conduction from the molten portion and radiate it. Then when the molten alloy and molten base portion is joined a welding contact is had and the alloy is cooled down to the temperature of the base material to start its process of congealation. The flame being then removed or transferred to some other base portion to be surfaced the joined alloy and base portion materials cool through their respective different congealing stages to solidification, when they comprise one integrally joined structure ready for grinding or other machining. The joint is securely made and is enduring. I find that the outer working surface portions of such joined stellite may by my process be substantially uncontaminated by mixture of the base material, but by virtue of the process described is substantially, as near as I can determine, of the same composition and qualities as it possessed prior to "flowing" it onto the base surface.

This die, which is formed principally of an inexpensive base metal, may be put into operation and used with its working edge or surface of stellite for practically as long as if the entire body of the die were made of such metallic alloy. When the working surface has become worn, it is only necessary to again apply a thin film or layer of stellite to the working surface by flowing the molten stellite onto the face of the die and welding or bonding in the manner above described.

In the case of tools, such as dipper teeth or the like, the shank or tool proper is cast or otherwise formed of a suitable inexpensive metal, while a film or layer of stellite is flowed over the point or working surface by the application of an oxy-acetylene flame to the stellite material and to the working surface of the base material simultaneously. The molten stellite is applied in a film to the surface of the tool, which is heated to a welding temperature, and the operation substantially as above described may be had to accomplish the welding of a thin film or layer of stellite onto the working face of the tool. The cost of such an operation is comparatively very small, there being only a few ounces of the expensive stellite required, whereas several pounds of the stellite would be necessary to replace the entire tool or even to weld, rivet or otherwise secure a portion comprising a point of the stellite to a shank of cheaper metal.

I have found that dipper teeth formed with a layer of stellite flowed onto the working point will last much longer than those integrally of either steel or stellite material and that the working point can be renewed by my method at a small fraction of the cost of renewals by ordinary means. The bringing of the stellite to the required welding temperature does not seriously affect, if at all, the hardness or cutting qualities of the material and I find that the stellite may be welded to the surface of cast iron, cast steel or other base metals without losing its qualities of hardness or other qualities required in such a working surface. Other tools or implements where stellite is to be welded onto a base material having considerable mass relative to the mass of stellite required to be melted at a given moment, may be treated in exactly the same manner.

The metal alloy "stellite" is well known in commerce and has a definite and well known alloy composition. This composition may vary in its proportions, but I have secured good results in the practice of my invention where the stellite composition comprises cobalt, chromium and tungsten in the proportions of 55 parts chromium, 30 parts of cobalt and 12 parts of tungsten. While other alloy compositions might be employed in the same manner as described and in which I flow the stellite, I preferably use stellite composition substantially as stated. Further, I have not found other high grade alloy compositions departing widely from that stated that will maintain their hardness, cutting properties or other necessary qualities at melting temperatures without deterioration or subsequent hardening treatment. I do not wish, however, to be limited to the use of stellite in the process which I employ, as other high grade alloy compositions may be found suitable for this purpose.

The chief properties of the alloy stellite are known. The alloy is extremely hard and wear resistant at normal temperatures. Also it retains its hardness and resistance to wear at temperatures as high as red heat. This makes it, as is known to the industry, highly desirable for heavy duty machine operations, such as metal cutting, and the like, and for all classes of services where the tool or part is subjected to great friction or abrasive action in use.

The possibility of flowing fused stellite upon various forms of iron and steel and getting it to bind thereto by union of its own substance with the iron or steel when the latter is brought up to a relatively high temperature, that is, to substantially fusion of the surface by the concentrated heat of the oxy-acetylene flame, or the electric arc, or the like, so that it is in the condition of being chemically and metallurgically active, was not known prior to my invention. When the stellite is deposited upon the surface as by fusing strips or pieces of small mass, it is brought in fused form upon the surface to be coated and it is also in an active state or condition for chemical or metallurgical action.

Whereas iron at its melting temperature is very active chemically, and will freely combine with oxygen of the air, the stellite when brought to the fusion temperature is substantially non-oxidizable and retains an effectively clear bright surface. Both the iron of the base and the alloy are metallurgically in condition to unite with each other. The constituents of the alloy, namely, chromium, cobalt, and tungsten, as is known to those skilled in the art, will individually alloy with iron. Suitable conditions for metallurgical union are thus established. At this time the heated non-oxidizable alloy covers and protects the surface of the heated oxidizable iron and when further heat is applied through the alloy the iron may be heated to a degree where it would oxidize and scale, but due to the stellite overlying the same, such heating is secured without oxidation of the iron.

The application of heat at this time to the surface of the deposited alloy keeps the alloy in a fluid condition, and the heat which is passed through the alloy to the face of the surface to be treated retains the iron thereof at a temperature high enough to unite with the material of the alloy and a surface union or metallurgical bond of great tenacity is formed.

The heating is then discontinued, for there is naturally a tendency for each to dissolve in the other if subjected to continued application of heat at a temperature high enough to maintain the two parts in fused condition.

In other words, the heating is stopped as soon as a bond has been secured, and at this stage, no appreciable amount of iron has migrated into the alloy or vice versa, and the alloy therefore remains substantially uncontaminated by mixture of the base material, and its composition and qualities therefore remain the same as before it was flowed onto the base surface.

I claim :—

1. The method of forming upon a metal base a working face of a wear resisting alloy such as stellite which consists in applying heat locally to the surface of the base to be treated, to bring the surface to be treated to substantially the melting point, depositing upon said surface a relatively small quantity of said alloy, said alloy being sufficiently resistant to chemical change when fused to prevent oxidation, whereby it will unite directly with the surface of the base, applying heat at a temperature higher than the melting points of the alloy and the base to the deposited alloy to bring said alloy to a fluid condition to cause said melted alloy to flow upon and bind to the surface of the base, leaving thereupon a layer of the alloy substantially uncontaminated by admixture of the base material, the free surface of the layer forming the working face.

2. The method of forming upon a ferrous base a wear resisting face of an alloy such as stellite, said alloy being of a high degree of hardness and resistance to wear, and being substantially non-oxidizable at the fusion temperature thereof, which consists in applying heat locally to the surface of the base to be treated by an oxy-acetylene flame or the like, bringing the surface to be treated to substantially the melting point, depositing upon said heated surface a small quantity of said alloy, applying heat to the deposited alloy and fusing the alloy and flowing the same upon the surface of the ferrous base, the heat applied to the surface of the alloy being sufficient to maintain the same in fluid condition and to cause it to spread upon the base and be at a higher temperature than the face of the base, the heat transmitted through the alloy to the base being sufficient to maintain the face of the base at a high enough temperature to fuse and bond with the engaging surface of the alloy, the heat being discontinued as soon as a substantial bond has been secured between the allow and the surface of the base, whereby the alloy above the meeting face is substantially free of iron from the base.

3. A tool comprising a base of ferrous metal upon a surface of which a film or layer of an alloy such as stellite substantially uncontaminated by the material of the base, has been flowed and congealed to form a working surface for the tool.

In testimony whereof I hereunto affix my signature this 4th day of May, 1925.

ALBERT F. FIFIELD.